US011242746B2

(12) United States Patent
Yan et al.

(10) Patent No.: US 11,242,746 B2
(45) Date of Patent: Feb. 8, 2022

(54) WELL PLANNING USING GEOMECHANICS NUDGE

(71) Applicant: Schlumberger Technology Corporation, Sugar Land, TX (US)

(72) Inventors: Gong Rui Yan, Beijing (CN); Zhenning Bao, Beijing (CN); Qing Liu, Beijing (CN); Bei Yan, Beijing (CN)

(73) Assignee: Schlumberger Technology Corporation, Sugar Land, TX (US)

( * ) Notice: Subject to any disclaimer, the term of this patent is extended or adjusted under 35 U.S.C. 154(b) by 395 days.

(21) Appl. No.: 16/248,943

(22) Filed: Jan. 16, 2019

(65) Prior Publication Data

US 2020/0224531 A1 Jul. 16, 2020

(51) Int. Cl.
*E21B 49/00* (2006.01)
*G01V 99/00* (2009.01)
*E21B 7/04* (2006.01)
*E21B 41/00* (2006.01)

(52) U.S. Cl.
CPC ............... *E21B 49/00* (2013.01); *E21B 7/04* (2013.01); *E21B 41/0092* (2013.01); *G01V 99/005* (2013.01)

(58) Field of Classification Search
CPC ........ E21B 49/00; E21B 7/04; E21B 41/0092; E21B 2200/20; E21B 47/02; E21B 43/305; G01V 99/005; G01V 9/005
See application file for complete search history.

(56) References Cited

U.S. PATENT DOCUMENTS

| 7,460,957 | B2 | 12/2008 | Prange et al. |
| 7,814,989 | B2 | 10/2010 | Nikolakis-Mouchas et al. |
| 8,812,334 | B2 | 8/2014 | Givens et al. |
| 9,745,842 | B2 | 8/2017 | Jain |

(Continued)

FOREIGN PATENT DOCUMENTS

WO 2017/196718 A1 11/2017

OTHER PUBLICATIONS

International Search Report and Written Opinion for PCT/US2020/013667 dated May 7, 2020.

(Continued)

*Primary Examiner* — Bijan Mapar
(74) *Attorney, Agent, or Firm* — Alec J. McGinn

(57) ABSTRACT

A method for planning and drilling a well includes receiving geomechanical and geological data for a subterranean domain, and receiving an initial well trajectory including a well path and survey points. The method includes conducting a wellbore stability analysis along the well trajectory based in part on the geomechanical and geological data. Conducting the wellbore stability analysis includes identifying a subset of the well path intervals along the well trajectory as having a risk for instability. The method includes calculating a geomechanics nudge for one or more survey points along the well trajectory. The geomechanics nudge is calculated as a derivative of the wellbore stability at the one or more survey points. The method includes modifying the one or more survey points and the one or more well path intervals connected thereto based in part on the geomechanics nudge to generate a modified well trajectory.

23 Claims, 9 Drawing Sheets

(56) References Cited

U.S. PATENT DOCUMENTS

| | | | |
|---|---|---|---|
| 2012/0179445 A1* | 7/2012 | Mitchell | E21B 47/022 |
| | | | 703/10 |
| 2012/0203525 A1 | 8/2012 | Rodriguez Herrera et al. | |
| 2013/0140037 A1* | 6/2013 | Sequeira, Jr. | E21B 7/04 |
| | | | 166/369 |
| 2016/0003008 A1* | 1/2016 | Uribe | E21B 7/04 |
| | | | 175/50 |
| 2016/0102544 A1 | 4/2016 | Aklestad et al. | |
| 2018/0051552 A1 | 2/2018 | Li et al. | |
| 2018/0075544 A1 | 3/2018 | Passolt et al. | |
| 2018/0106133 A1 | 4/2018 | Bolchover et al. | |
| 2018/0113966 A1 | 4/2018 | Reese et al. | |

OTHER PUBLICATIONS

International Preliminary Report on Patentability for the equivalent PCT/US2020/013667 dated Jul. 29, 2021, 7 pages.

* cited by examiner

WELL PLANNING USING GEOMECHANICS NUDGE

BACKGROUND

Drilling wellbores deep into the Earth presents several different types of challenges. One challenge experienced is mechanical failure of the wellbore wall, which may result from interplay between the surrounding rock formation and well-drilling activities. In an effort to anticipate and avoid such failures, the mechanical properties of the rock formation may be modeled using a mechanical earth model (MEM), which may allow for simulation and evaluation of the impact of drilling activities, different well plans, etc., on well drilling efficiency and safety. Such mechanical properties of the rock, as well as drilling/well orientation, downhole mud pressure and temperature, among others, are factors controlling this interplay and determining wellbore stability. Depending on formation in-situ stress anisotropy and rock deformation and strength inhomogeneities and anisotropy, there should exist a range of trajectories that make the well drilling safer and more effective than drilling in other directions.

Geomechanical data and modeling analysis is thus integral to planning the well path (i.e., the trajectory along which the well is to be drilled). Such analysis may provide a solution and/or recommendation of favorable well orientations and drilling practices, based on integrating geomechanical modeling to the well plan system. Moreover, such analysis may consider other well-design engineering factors, for example, the dogleg severity, which may be combined and included in the model to enhance well design.

This geomechanical modelling for well design process generally relies on integrated multidisciplinary geoscience modelling experience and big data analytics modelling capabilities. Thus, this processing is normally conducted on a trial-and-error basis by an interdisciplinary team with a wide range of experience. The process generally starts with a well plan ("survey") and then replaces the well plan with different well plans (modifications of the prior well plan) iteratively, until a resulting well path is chosen. The success and efficiency in the process of determining how to alter the well plan relies heavily on the experience of the operator, and effective communication between well plan system and geomechanical model system.

SUMMARY

A method for planning and drilling a well is disclosed. The method includes receiving geomechanical and geological data for a subterranean domain and receiving an initial well trajectory including a well path and survey points. Each survey point has one or more well path intervals connected thereto. The method includes conducting a wellbore stability analysis along the well trajectory based in part on the geomechanical and geological data. Conducting the wellbore stability analysis includes identifying a subset of the well path intervals along the well trajectory as having a risk for instability. The method includes calculating a geomechanics nudge for one or more survey points along the well trajectory. The geomechanics nudge is calculated as a derivative of the wellbore stability at the one or more survey points. The method includes modifying the one or more survey points and the one or more well path intervals connected thereto based in part on the geomechanics nudge to generate a modified well trajectory.

A computing system is also disclosed. The computing system includes one or more processors, and a memory system including one or more non-transitory, computer-readable media storing instructions that, when executed by at least one of the one or more processors, cause the computing system to perform operations. The operations include receiving geomechanical and geological data for a subterranean domain, and receiving an initial well trajectory including a well path and survey points. Each survey point has one or more well path intervals connected thereto. The operations include conducting a wellbore stability analysis along the well trajectory based in part on the geomechanical and geological data. Conducting the wellbore stability analysis includes identifying a subset of the well path intervals along the well trajectory as having a risk for instability. The operations include calculating a geomechanics nudge for one or more survey points along the well trajectory. The geomechanics nudge is calculated as a derivative of the wellbore stability at the one or more survey points. The operations include modifying the one or more survey points and the one or more well path intervals connected thereto based in part on the geomechanics nudge to generate a modified well trajectory.

A non-transitory computer-readable medium is further disclosed. The medium stores instructions that, when executed by at least one of the one or more processors, cause the computing system to perform operations. The operations include receiving geomechanical and geological data for a subterranean domain, and receiving an initial well trajectory including a well path and survey points. Each survey point has one or more well path intervals connected thereto. The operations include conducting a wellbore stability analysis along the well trajectory based in part on the geomechanical and geological data. Conducting the wellbore stability analysis includes identifying a subset of the well path intervals along the well trajectory as having a risk for instability. The operations include calculating a geomechanics nudge for one or more survey points along the well trajectory. The geomechanics nudge is calculated as a derivative of the wellbore stability at the one or more survey points. The operations include modifying the one or more survey points and the one or more well path intervals connected thereto based in part on the geomechanics nudge to generate a modified well trajectory.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
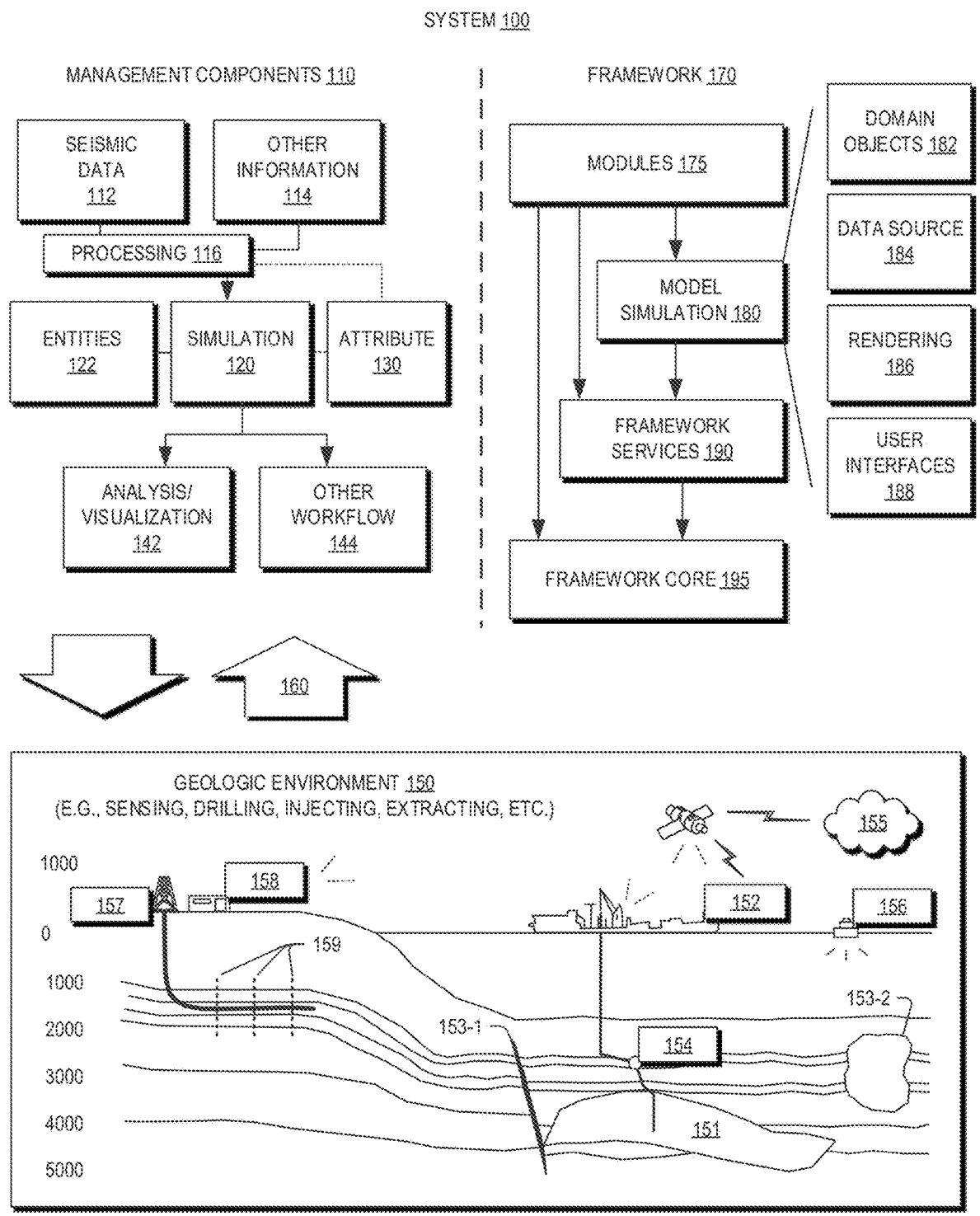
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Wash.), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
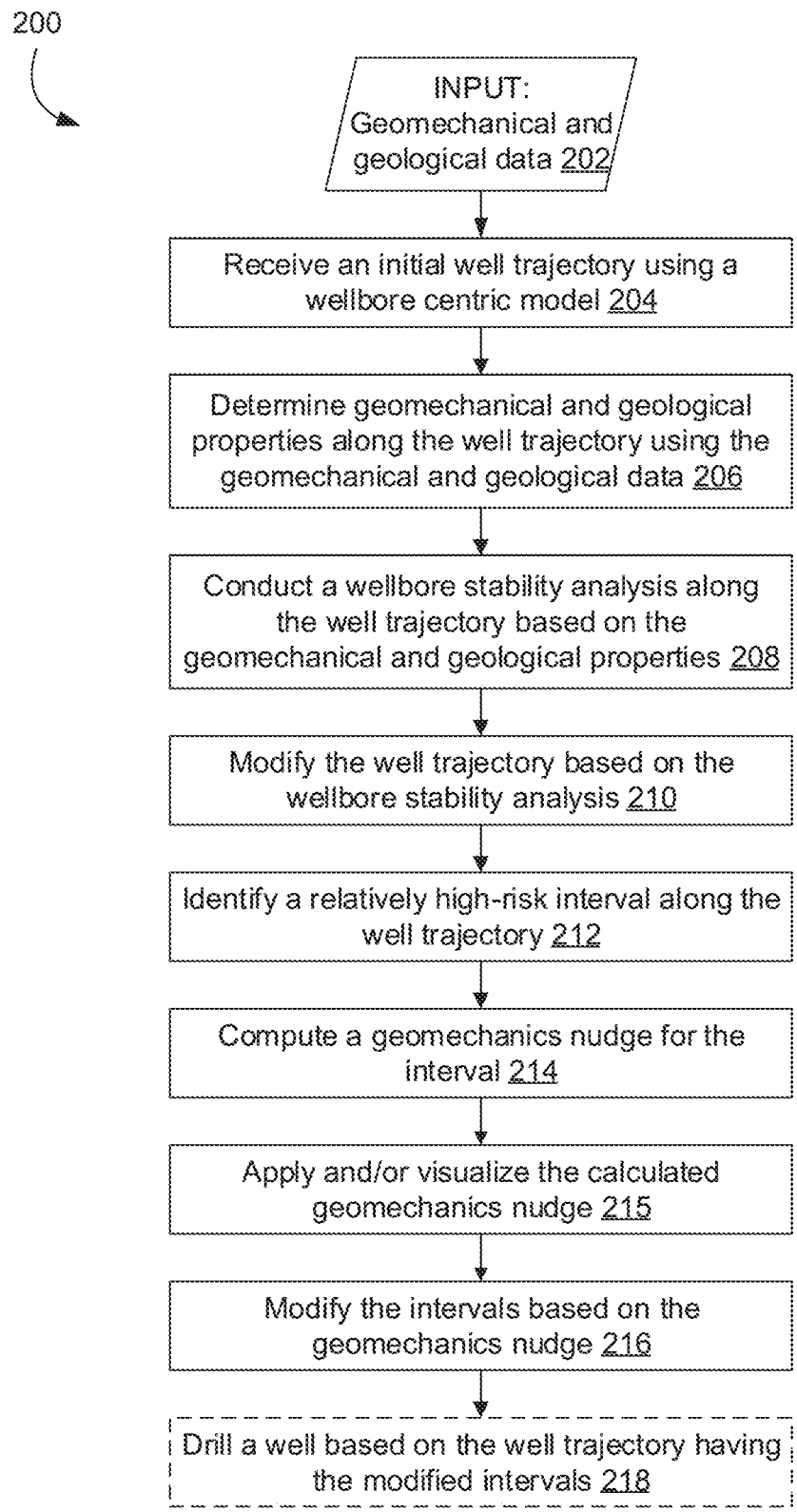
FIG. 2 illustrates a flowchart of a method for drilling, e.g., including designing and refining a well plan using a geomechanics nudge analysis, according to an embodiment.

FIG. 2 illustrates a flowchart of a method 200 for planning and drilling a well, according to an embodiment. More particularly, the method 200 may relate to determining a well path along which a well can be drilled, and, in some embodiments, then steering the drilling operations along the determined well path. Some embodiments of the method 200 may not, however, include drilling, but rather may include visualizing a two or three dimensional rendering of the determined well. Furthermore, it will be appreciated that the various actions shown in FIG. 2 and described herein may be conducted out of the illustrated sequence, two or more actions may be combined or conducted in parallel, or any of the actions may be separated into two or more separate actions, without departing from the scope of the disclosure.

Referring now to the specific, illustrated embodiment of FIG. 2, the method 200 may begin by receiving geomechanical and/or geological data as an input, as at 202. Geomechanical data may include data related to the mechanical properties of a subterranean domain of interest, e.g., rock formation(s) through which a well may be drilled in order to arrive at a target, such as a hydrocarbon reservoir. Such data may include stress characteristics of the rock formation, and the like. Further, the geological data may specify type of rock, structure, etc. The method 200 may also include receiving or determining an initial well trajectory, as at 204.

Figure 3:
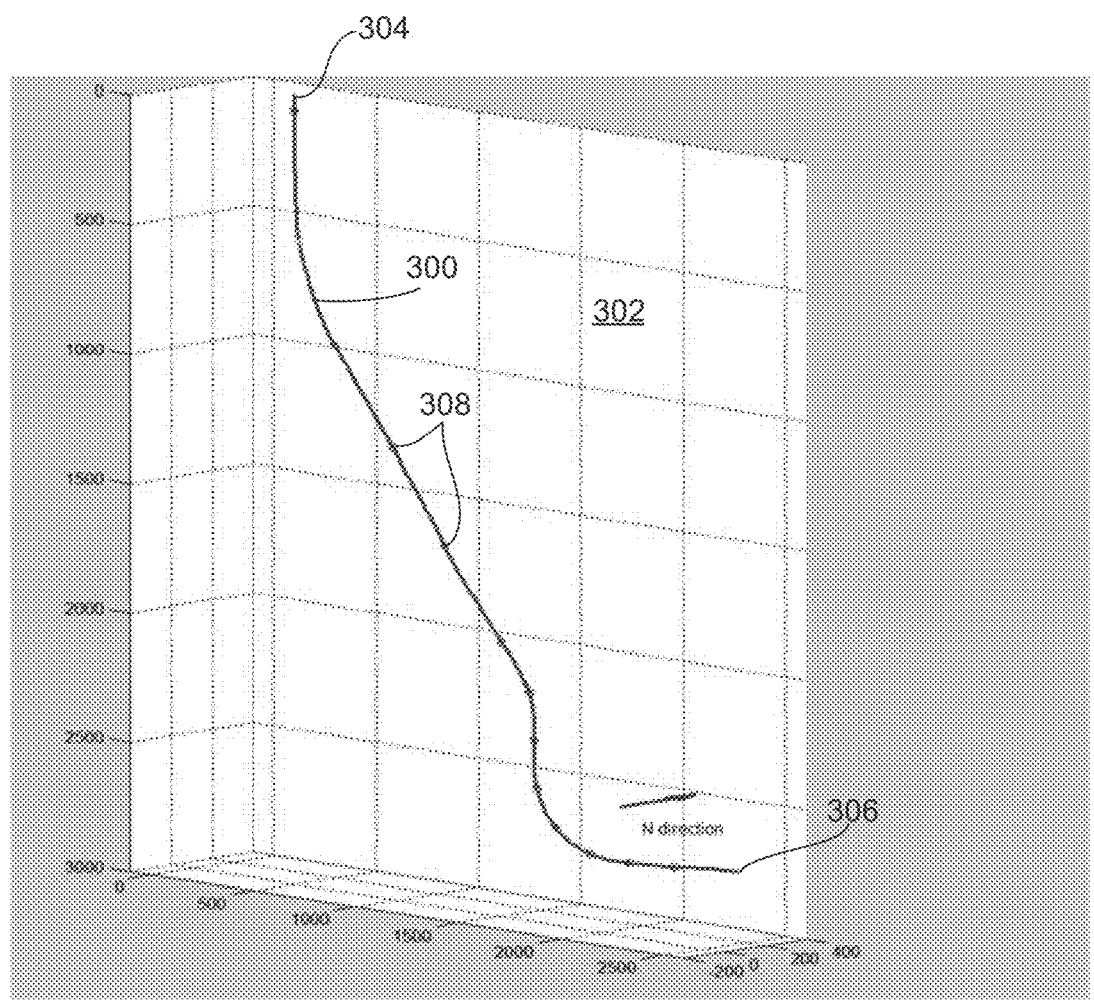
FIG. 3 illustrates a well trajectory in a subterranean domain, according to an embodiment.

FIG. 3 illustrates an example of an initial well trajectory 300 within a subterranean domain 302. The initial well trajectory 300 extends from a well top 304 at the surface (e.g., depth=0) to a target 306 that may be offset from the well top 304 vertically (depth) as well as horizontally (in the North-East plane). Further, the initial well trajectory 300 may define survey points (or "station points") 308 at various depth intervals along the well trajectory 300. Each survey point 308 may have one or more intervals connected thereto (e.g., apart from the shallowest and deepest survey points 308, each survey point 308 may have two intervals connected thereto).

Returning to FIG. 2, the method 200 may include determining geomechanical and geological properties along the well trajectory using the geomechanical and geological data, as at 206. The method 200 may then include conducting a wellbore stability analysis along the well trajectory based on the geomechanical and geological properties, as at 208. Wellbore stability is conducted using a wellbore-centric model, as at 208. An example of a wellbore-centric model is provided by Stonefish DLL, which provides geomechanics sensitivity modelling on wellbore trajectory. Further, the processing power for the wellbore centric modelling can be deployed on a cloud infrastructure that enables integration and communication of geomechanics data and modelling with well plan systems.

For example, the wellbore stability analysis can determine wellbore induced stress and deformation, borehole failure risk, safe and stable mud-weight window, borehole orientation versus stability, and data uncertainties assessment and model calibration.

Figure 4:
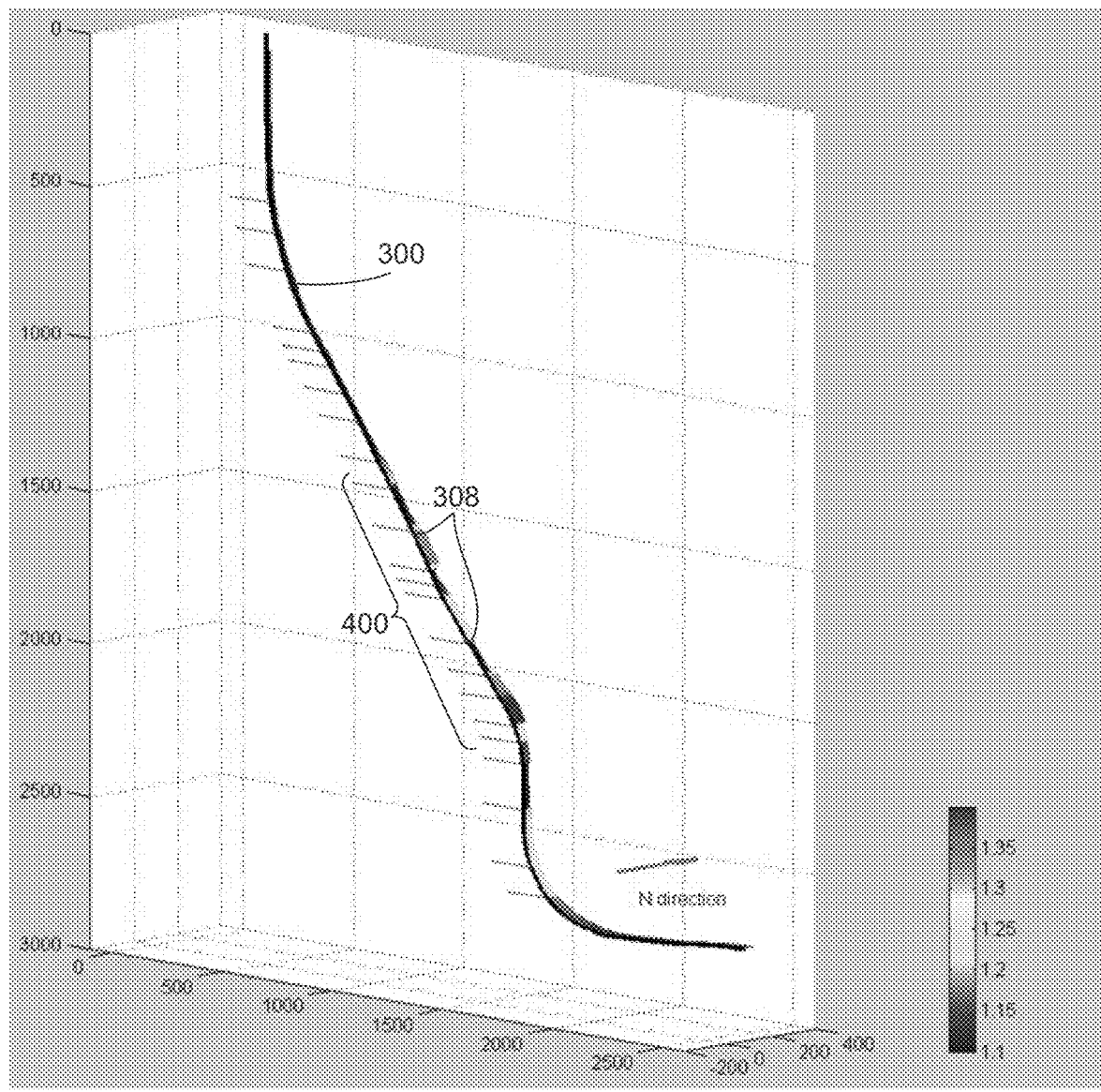
FIG. 4 illustrates the well trajectory of FIG. 3, with a wellbore stability analysis result overlaid thereon, according to an embodiment.

The result of this wellbore stability analysis may be mapped to the well trajectory 300, as shown in FIG. 4. As can be seen, a spectrum of values for one or more stability measures can be overlaid on the trajectory 300 itself, e.g., along windows or intervals between the survey points 308. For example, the stability measure may be the minimum mud weight to prevent borehole breakout, with higher mud weights indicating reduced stability. The method 200 may then include analyzing the drilling risk based on the wellbore stability analysis and propose recommendations for updating and refining the well plan, e.g., creating a new well plan that is a modification of the initial well plan, as at 210. Such modifications may include adjustments to the location of various survey points 308 along the well trajectory 300.

Figure 5:
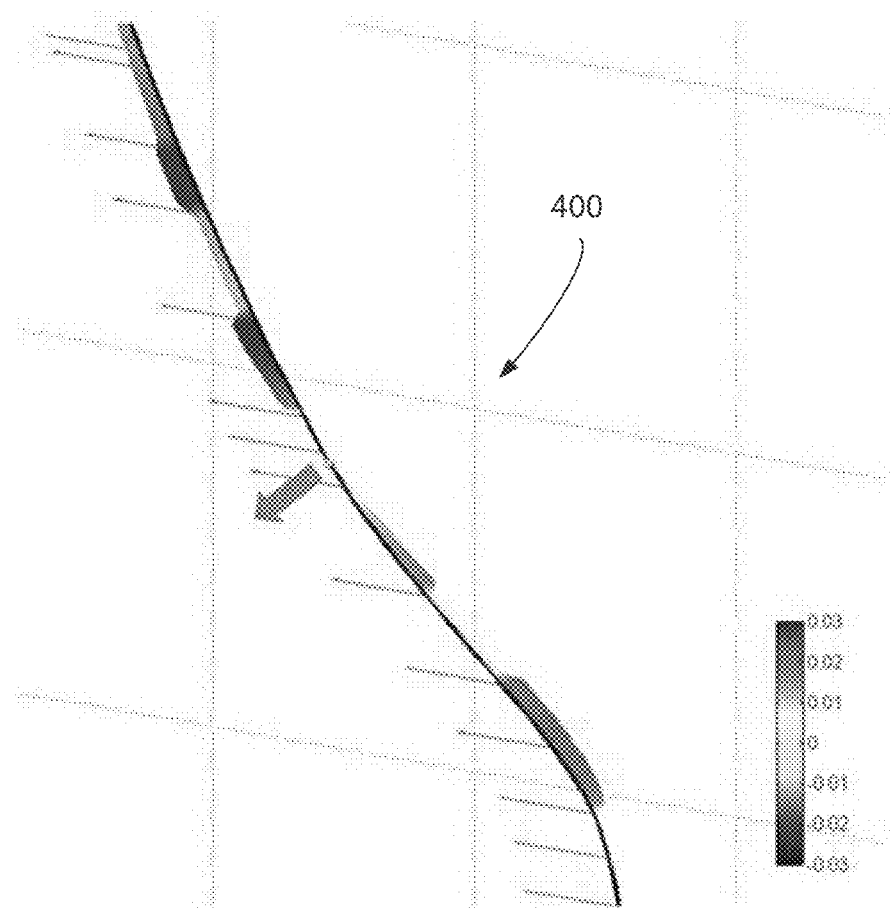
FIG. 5 illustrates a high-risk interval of the well trajectory of FIG. 4, according to an embodiment.

The method 200 may then include identifying the high-risk intervals along the well trajectory, as at 212. For example, referring again to FIG. 4, a high-risk interval 400 may be identified. In a specific example, the high-risk interval 400 may be identified as a depth interval with a potential instability problem (e.g., a risk value that is higher than other (or all) other intervals and/or a risk value that exceeds a predetermined risk-tolerance threshold value), for example, a narrow mud weight window. In a specific example, the interval with the worst potential instability problem, in comparison to each of the other intervals, may be identified. In other embodiments, any subset of one or more of the intervals may be identified as high risk. The depth intervals may be uniform in depth/length along the well trajectory 300, e.g., a certain distance such as 20 meters may be used, or may be established in any other way. FIG. 5 illustrates an enlarged view of the interval 400 identified as having the high-risk at 212.

As will be described in greater detail below, the method 200 may then include computing a geomechanics "nudge" or tendency for the interval, as at 214. In another embodiment, the geomechanics nudge could be computed for one, some, or all intervals along the well trajectory. "Geomechanical tendency" is the derivative of the wellbore stability condition to well orientation changes (nudges or updates from the current position), at one or more survey points along the planned well path.

The method 200 may also include applying the calculated geomechanics nudge, as at 215, as a vector force on survey point in two and/or three-dimensional visualizing of well trajectory in the subterranean domain, as will be described in greater detail below. Moreover, in some implementations, this may trigger an interactive graphic design mode, e.g., in which the well trajectory is illustrated along with the calculated geomechanics tendency/nudge, which may facilitate user interaction with and implementation of the analysis.

The method 200 may then proceed to modifying the interval(s) based on the geomechanics nudge, as at 216. For example, the location of and/or penetration angle of the wellbore at a survey point may be adjusted, e.g., by moving the survey point. In turn, this may affect the location and penetration angle of the depth intervals connected to the survey point. This may be an iterative workflow, as one modification of one survey point may result in a recalculation of the well trajectory (e.g., loop back to 208), and a subsequent wellbore stability analysis (210) and/or computation of another geomechanics nudge (214) at one, some, or all of the survey points along the well trajectory. The method 200 may allow for multiple well trajectory scenarios to be compared, e.g., based on wellbore stability condition, mud weight window, dogleg severity, or any other relevant factor. The selected well trajectory may minimize breakout risk and mud loss risk, and/or minimizing mud weight to improve drilling performance (e.g., based on rate of penetration).

Figure 6:
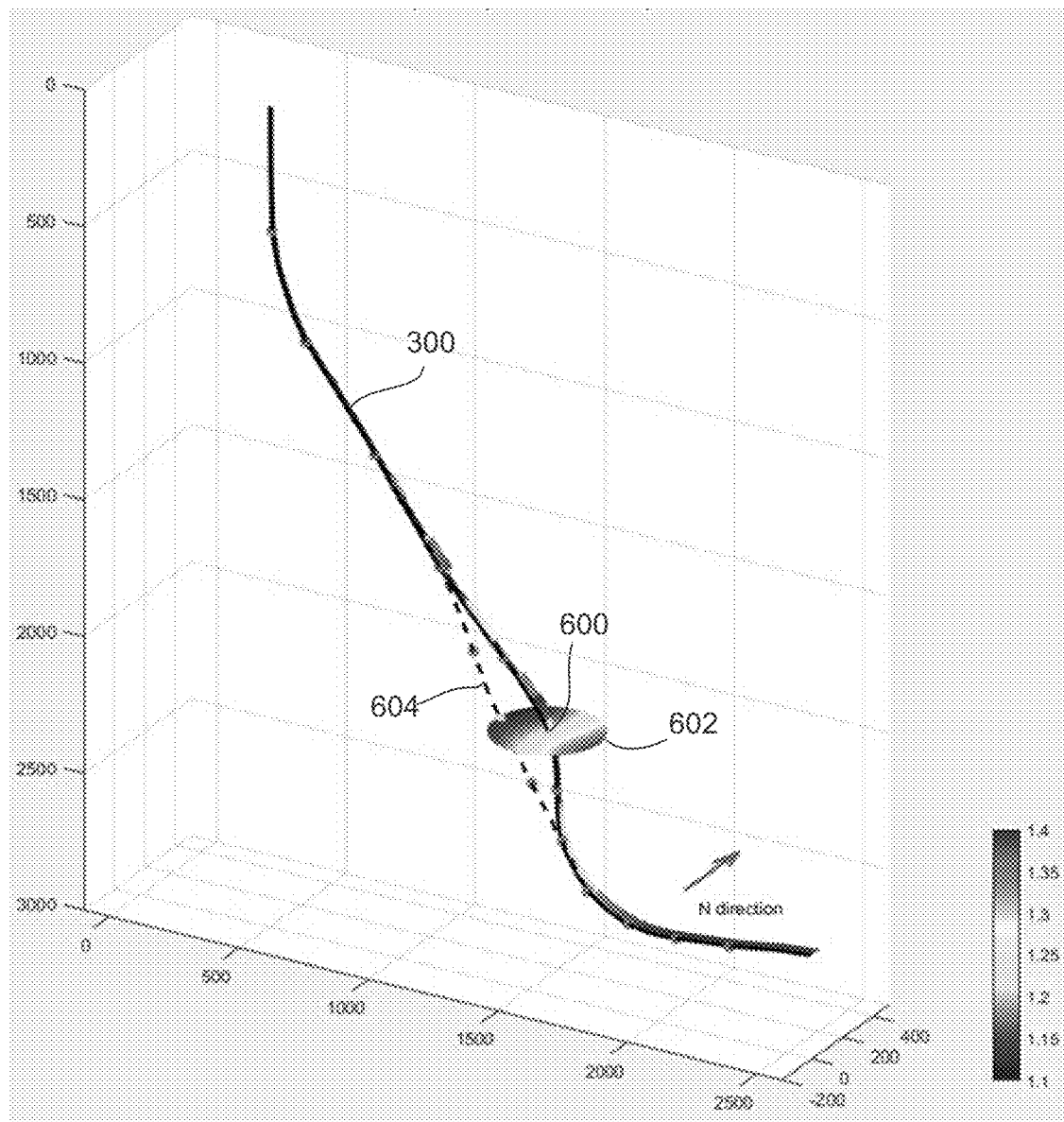
FIG. 6 illustrates a visualization of the well trajectory of FIG. 4 with a geomechanics nudge analysis computed for a survey point thereof, according to an embodiment.

FIG. 6 illustrates a visual display of a geomechanical nudge calculated for a survey point 600. As shown, the nudge is represented as a circle 602 centered at the point 600. The circle 602 may be colored, patterned, or otherwise used to display anticipated changes in the wellbore stability measure, e.g., if the survey point 600 is moved to another location within the circle 602, e.g., thereby moving a portion of the well trajectory 300, as indicated by the dashed line 604. Further, such a visualization of the nudge may be easily comprehended by a human user.

Figure 7:
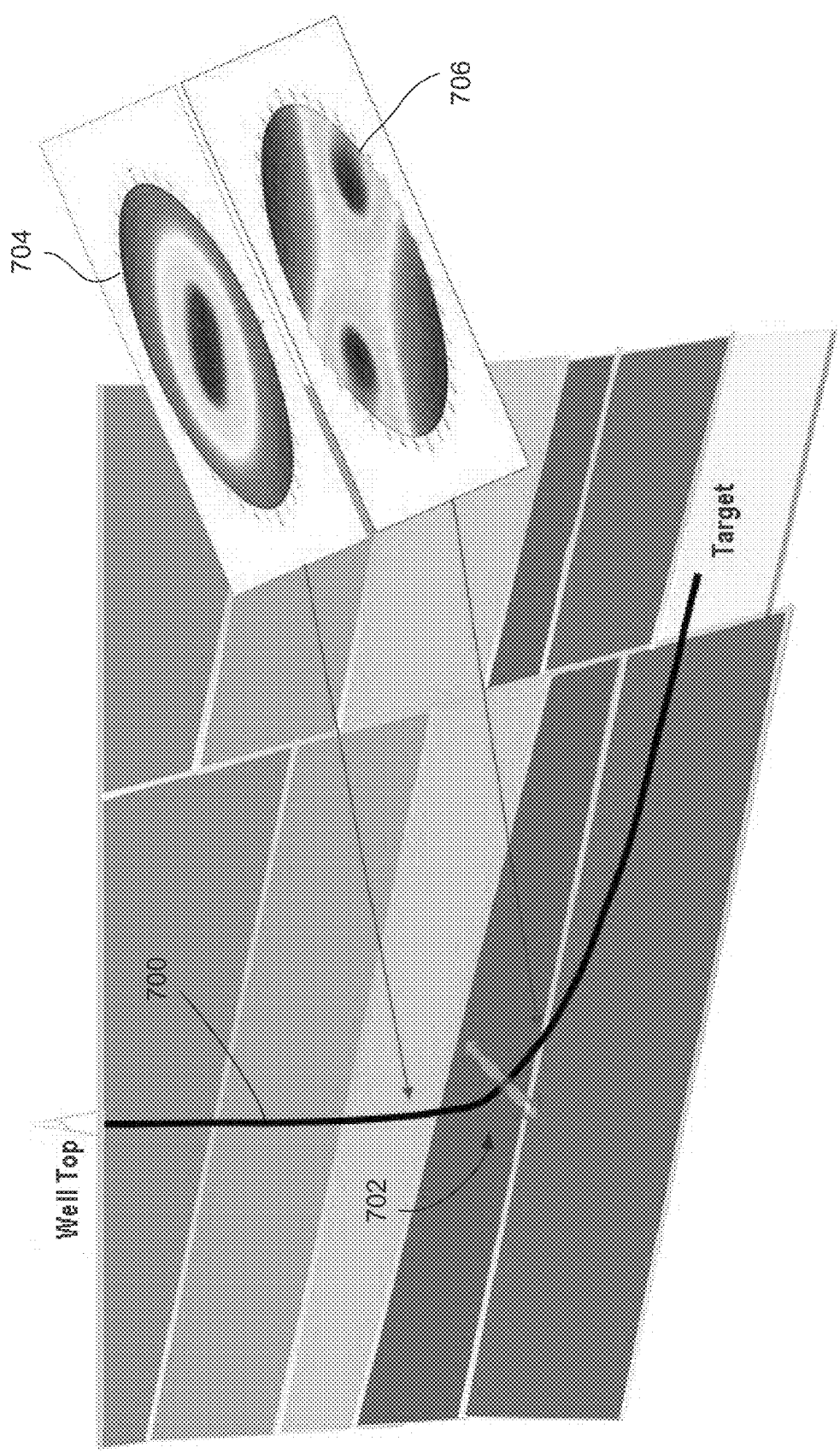
FIG. 7 illustrates another well trajectory in a subterranean domain, with two geomechanics nudge calculations made along an interval thereof, according to an embodiment.

Similarly, FIG. 7 illustrates a well trajectory 700 in which geomechanical scanning is conducted along an interval 702. Geomechanics nudge may be computed on a subset of or each survey point along well path 700. For example, the geomechanics nudge calculation may apply an accelerating/damping force (vector) on an adjustment hander when the well plan system and/or a user is trying to adjust the orientation/position of the analyzed survey points. The two polar plots 704, 706 in the right demonstrate the background geomechanical scanning analysis utilizing geomechanical data and model (e.g., the nudge/tendency calculation).

For example, the planned well path may be defined by n survey points (e.g., station points) (i=1,2, . . . , n), and the prior condition to run geomechanical modeling is ready (e.g., the pre-drill geomechanical model and geological description of the analyzed field has been created and input into the system, as at 202). The wellbore stability condition/measure and its variation $WBS_i(azi, dev)$ at survey point i is represented as:

$$WBS_i(azi,dev) = \int_{MD(i-1)}^{MD(i)} [W(x) \cdot f_{WBS}(x,azi,dev) + P(x,azi,dev)]dx$$

and the geomechanics nudge (tendency vector) is represented as:

$$TF\_Azi_i(azi, dev) = \frac{d(WBS_i(azi, dev))}{d(azi)}$$

$$TF\_Dev_i(azi, dev) = \frac{d(WBS_i(azi, dev))}{d(dev)}$$

where x is well path depth=MD(i−1) to MD(i), represents well path intervals that may be affected by this survey point i adjustment, $f_{WBS}(x, azi, dev)$ is the wellbore stability scanning result as a function of adjusting borehole orientation angles (azimuth and deviation) at point i, W (x) is the weight function which can be related to borehole mechanical failure risk, and P(x, azi, dev) is a penalty factor representing other geomechanical factors that may not be included in the geomechanical scanning analysis. Two examples of the scanning result $f_{WBS}(x, azi, dev)$ on two intervals affected by this survey point i, is shown in FIG. 7, as mentioned above.

The geomechanics nudge can work directly on well plan system, as shown in FIG. 7. The tendency vector on survey point i will be applying on the 'Adjustment Handle' when the user is in working on well trajectory and triggering on this survey point.

Figure 8:
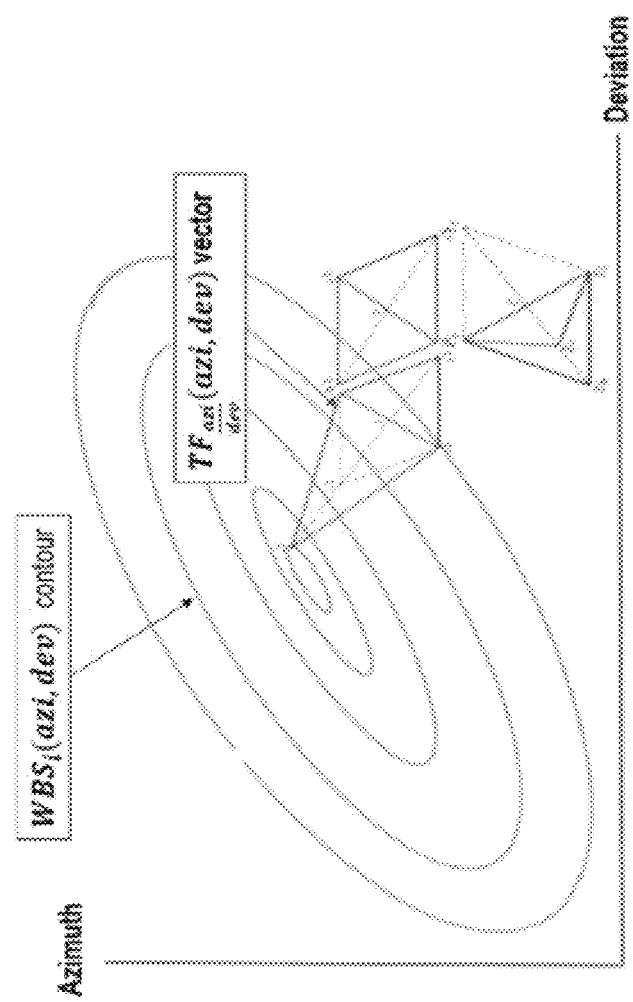
FIG. 8 illustrates a conceptual view of the geomechanics nudge calculation, according to an embodiment.

FIG. 8 illustrates a calculation of geomechanics nudge at a survey point i. In the plot, the various circles indicate contour of wellbore stability condition, and the vectors present geomechanics nudge for moving (adjusting) the survey point azimuth and deviation angles. In other words, FIG. 8 shows one example of wellbore stability variations ($WBS_i(azi,dev)$) and the geomechanics nudge ($TF\_Azi_i(azi, dev)$ and $TF\_Dev_i(azi, dev)$) computed at one survey point.

The geomechanics nudge may also be defined and computed on a spatial coordinate system (North-East-Vertical), where survey point i position are the variation parameters for scanning analysis and wellbore path adjustment, as shown in 602. By introducing this nudge and conducting a geomechanical data and model analysis, a direct transfer of a geomechanical model to well trajectory plan and optimization may be achieved. A geomechanical modeling simulator is in the background to scanning the potential moving direction of the well path interval (from MD(i−1) to MD(i)) and conducting the simulation.

Some embodiments of this method 200 may be applied outside of well path design based on wellbore stability and drilling safety. Indeed, some embodiments may be applicable to other parts of well plan, drilling and completion programs, for example, the geomechanics nudge can be defined relating to reservoir hydraulic fracturability and sanding-free productivity, where borehole and perforation angles penetrated through reservoir formation are important factors affecting well productivities. Therefore, this geomechanics nudge can be extended and applied to wellbore hydraulic fracture design and sanding-free production design programs.

Also, the device can be applicable in well drilling execution phase when measured and observed drilling data suggests an updating on the prior drill model, then this method 200 may be applied to scan any potential changes of well path ahead of bit, compute geomechanics nudge to steer the bit to continue the drilling, as at 208.

Figure 9:
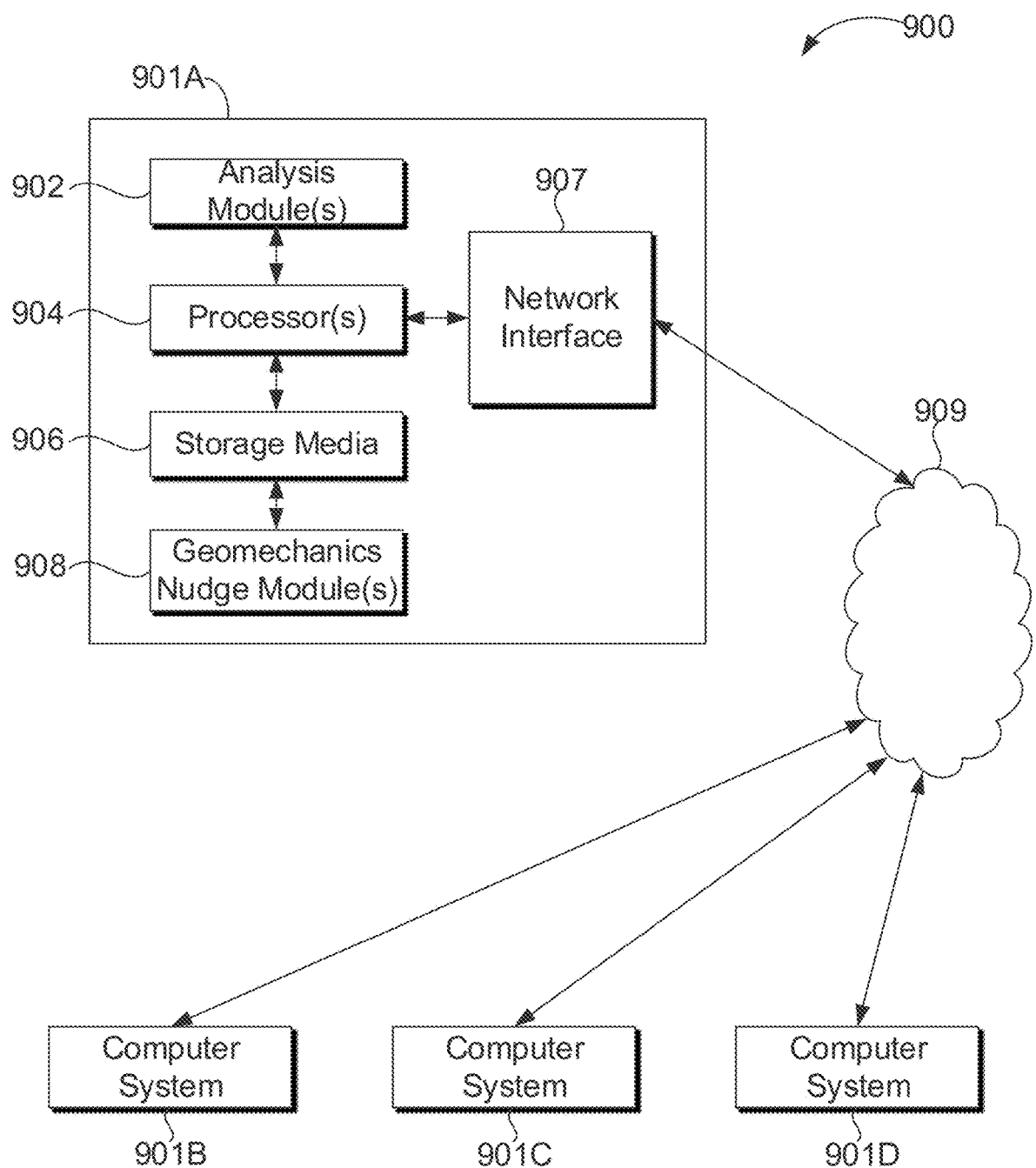
FIG. 9 illustrates a schematic view of a computing system, according to an embodiment.

In some embodiments, the methods of the present disclosure may be executed by a computing system. FIG. 9 illustrates an example of such a computing system 900, in accordance with some embodiments. The computing system 900 may include a computer or computer system 901A, which may be an individual computer system 901A or an arrangement of distributed computer systems. The computer system 901A includes one or more analysis modules 902 that are configured to perform various tasks according to some embodiments, such as one or more methods disclosed herein. To perform these various tasks, the analysis module 902 executes independently, or in coordination with, one or more processors 904, which is (or are) connected to one or more storage media 906. The processor(s) 904 is (or are) also connected to a network interface 907 to allow the computer system 901A to communicate over a data network 909 with one or more additional computer systems and/or computing systems, such as 901B, 901C, and/or 901D (note that computer systems 901B, 901C and/or 901D may or may not share the same architecture as computer system 901A, and may be located in different physical locations, e.g., computer systems 901A and 901B may be located in a processing facility, while in communication with one or more computer systems such as 901C and/or 901D that are located in one or more data centers, and/or located in varying countries on different continents).

A processor may include a microprocessor, microcontroller, processor module or subsystem, programmable integrated circuit, programmable gate array, or another control or computing device.

The storage media 906 may be implemented as one or more computer-readable or machine-readable storage media. Note that while in the example embodiment of FIG. 9 storage media 906 is depicted as within computer system 901A, in some embodiments, storage media 906 may be distributed within and/or across multiple internal and/or external enclosures of computing system 901A and/or additional computing systems. Storage media 906 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 900 contains one or more geomechanics nudge analysis module(s) 908. In the example of computing system 900, computer system 901A includes the geomechanics nudge analysis module 908. In some embodiments, a single geomechanics nudge analysis module may be used to perform some aspects of one or more embodiments of the methods disclosed herein. In other embodiments, a plurality of geomechanics nudge analysis modules may be used to perform some aspects of methods herein.

It should be appreciated that computing system 900 is merely one example of a computing system, and that computing system 900 may have more or fewer components than shown, may combine additional components not depicted in the example embodiment of FIG. 9, and/or computing system 900 may have a different configuration or arrangement of the components depicted in FIG. 9. The various components shown in FIG. 9 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 900, FIG. 9), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosed embodiments and various embodiments with various modifications as are suited to the particular use contemplated.

What is claimed is:

1. A method for planning and drilling a well, comprising:
receiving geomechanical and geological data for a subterranean domain;
receiving an initial well trajectory including a well path and survey points, wherein each survey point has one or more well path intervals connected thereto;
determining a wellbore stability along the initial well trajectory based in part on the geomechanical and geological data, wherein determining the wellbore stability includes identifying a subset of the well path intervals along the initial well trajectory as having a risk for instability;
calculating a geomechanics nudge for one or more of the survey points along the initial well trajectory, wherein calculating the geomechanics nudge comprises identifying a plurality of concentric circles that represent contours of the wellbore stability, and wherein the geomechanics nudge is calculated as a derivative of the wellbore stability at the one or more survey points;
modifying the one or more survey points and the one or more well path intervals connected thereto based in part on the geomechanics nudge to generate a modified well trajectory; and
visualizing the calculated geomechanics nudge, the modified well trajectory, or both in a digital model of the subterranean domain.

2. The method of claim 1, wherein modifying the one or more survey points comprises adjusting a location, penetration angle, or both of the one or more survey points to improve a wellbore stability condition at the one or more survey points and the one or more well path intervals connected thereto.

3. The method of claim 1, wherein identifying the subset of the intervals along the initial well trajectory as having the risk for instability comprises:
calculating a value for wellbore stability for the respective intervals;
comparing the value with a predetermined threshold value or with values associated with other intervals;
determining that the intervals are high risk based on the comparing; and
in response to determining that the intervals are high risk, determining the geomechanics nudge for one or more survey points in the identified intervals, and not in one or more other intervals that were not identified as being high risk.

4. The method of claim 1, further comprising:
determining the wellbore stability for the modified well trajectory after modifying the one or more survey points;
selecting an interval between two of the survey points based on the wellbore stability thereof;
calculating the geomechanics nudge for the two of the survey points; and
modifying a location and penetration angle of the two of the survey points based on the geomechanics nudge.

5. The method of claim 4, wherein the geomechanics nudge comprises a derivative of the wellbore stability with respect to survey point spatial position changes.

6. The method of claim 1, wherein determining the wellbore stability comprises calculating the wellbore stability for one or more of the intervals affected by one of the survey points as a function of a survey point adjustment, a weight function, and a penalty factor representing geomechanical issues not included in a wellbore stability scanning result.

7. The method of claim 1, further comprising:
applying the calculated geomechanics nudge as a vector force on the one or more survey points in the digital model of the subterranean domain; and
trigging an interactive graphic design mode in the digital model.

8. The method of claim 1, further comprising drilling a wellbore along the modified well trajectory.

9. A computing system, comprising:
one or more processors; and
a memory system comprising one or more non-transitory computer-readable media storing instructions that, when executed by at least one of the one or more processors, cause the computing system to perform operations, the operations comprising:
receiving geomechanical and geological data for a subterranean domain;
receiving an initial well trajectory including a well path and survey points, wherein each survey point has one or more well path intervals connected thereto;
determining a wellbore stability along the initial well trajectory based in part on the geomechanical and geological data, wherein determining the wellbore stability includes identifying a subset of the well path intervals along the initial well trajectory as having a risk for instability;
calculating a geomechanics nudge for one or more of the survey points along the initial well trajectory, wherein calculating the geomechanics nudge comprises identifying a plurality of concentric circles that represent contours of the wellbore stability, and wherein the geomechanics nudge is calculated as a derivative of the wellbore stability at the one or more survey points;
modifying the one or more survey points and the one or more well path intervals connected thereto based in part on the geomechanics nudge to generate a modified well trajectory; and
visualizing the calculated geomechanics nudge, the modified well trajectory, or both in a digital model of the subterranean domain.

10. The system of claim 9, wherein modifying the one or more survey points comprises adjusting a location, penetration angle, or both of the one or more survey points to improve a wellbore stability condition at the one or more survey points and the one or more well path intervals connected thereto.

11. The system of claim 9, wherein identifying the subset of the intervals along the initial well trajectory as having the risk for instability comprises:
calculating a value for wellbore stability for the respective intervals;
comparing the value with a predetermined threshold value or with values associated with other intervals;
determining that the intervals are high risk based on the comparing; and
in response to determining that the intervals are high risk, determining the geomechanics nudge for one or more survey points in the identified intervals, and not in one or more other intervals that were not identified as being high risk.

12. The system of claim 9, wherein the operations further comprise:
determining the wellbore stability for the modified well trajectory after modifying the one or more survey points;
selecting an interval between two of the survey points based on the wellbore stability thereof;
calculating the geomechanics nudge for the two of the survey points; and
modifying a location and penetration angle of the two of the survey points based on the geomechanics nudge.

13. The system of claim 9, wherein determining the wellbore stability comprises calculating the wellbore stability for one or more of the intervals affected by one of the survey points as a function of a survey point adjustment, a weight function, and a penalty factor representing geomechanical issues not included in a wellbore stability scanning result.

14. A non-transitory computer-readable medium storing instructions that, when executed by one or more processors of a computing system, cause the computing system to perform operations, the operations comprising:
receiving geomechanical and geological data for a subterranean domain;
receiving an initial well trajectory including a well path and survey points, wherein each survey point has one or more well path intervals connected thereto;
determining a wellbore stability along the initial well trajectory based in part on the geomechanical and geological data, wherein determining the wellbore stability includes identifying a subset of the well path intervals along the initial well trajectory as having a risk for instability;
calculating a geomechanics nudge for one or more of the survey points along the initial well trajectory, wherein calculating the geomechanics nudge comprises identifying a plurality of concentric circles that represent contours of the wellbore stability, and wherein the geomechanics nudge is calculated as a derivative of the wellbore stability at the one or more survey points;
modifying the one or more survey points and the one or more well path intervals connected thereto based in part on the geomechanics nudge to generate a modified well trajectory; and
visualizing the calculated geomechanics nudge, the modified well trajectory, or both in a digital model of the subterranean domain.

15. The medium of claim 14, wherein the operations further comprise:
determining the wellbore stability for the modified well trajectory after modifying the one or more survey points;
selecting an interval between two of the survey points based on the wellbore stability thereof;
calculating the geomechanics nudge for the two of the survey points; and
modifying a location and penetration angle of the two of the survey points based on the geomechanics nudge.

16. The medium of claim 14, wherein the operations further comprise:

applying the calculated geomechanics nudge as a vector force on the one or more survey points in the digital model of the subterranean domain; and trigging an interactive graphic design mode in the model.

17. The method of claim 1, wherein calculating the geomechanics nudge also comprises determining one or more vectors that represent the geomechanics nudge for adjusting an azimuth angle of the one or more survey points, a deviation angle of the one or more survey points, or both.

18. The method of claim 1, wherein the geomechanics nudge comprises a first value, and wherein the first value comprises a derivative of the wellbore stability divided by a derivative of an azimuth of the initial well trajectory.

19. The method of claim 18, wherein the geomechanics nudge also comprises a second value, and wherein the second value comprises the derivative of the wellbore stability divided by a derivative of a deviation of the initial well trajectory.

20. The method of claim 1, wherein determining the well stability comprises:

determining a wellbore stability scanning result as a function of a survey point adjustment from a current angle at a well path depth; and determining an integral of the wellbore stability scanning result.

21. The method of claim 20, wherein determining the well stability further comprises:

multiplying the wellbore stability scanning result by a weight function to produce a product; and determining the integral of the product.

22. The method of claim 21, wherein determining the well stability further comprises:

adding a penalty factor to the product to produce a sum, wherein the penalty factor represents geomechanical issues that are not factored into to the wellbore stability scanning result; and determining an integral of the sum.

23. The method of claim 22, wherein the integral of the sum is conducted over the subset of the well path intervals.

* * * * *